Feb. 9, 1943.    A. A. WYCKOFF    2,310,485
FAUCET
Filed Sept. 3, 1940
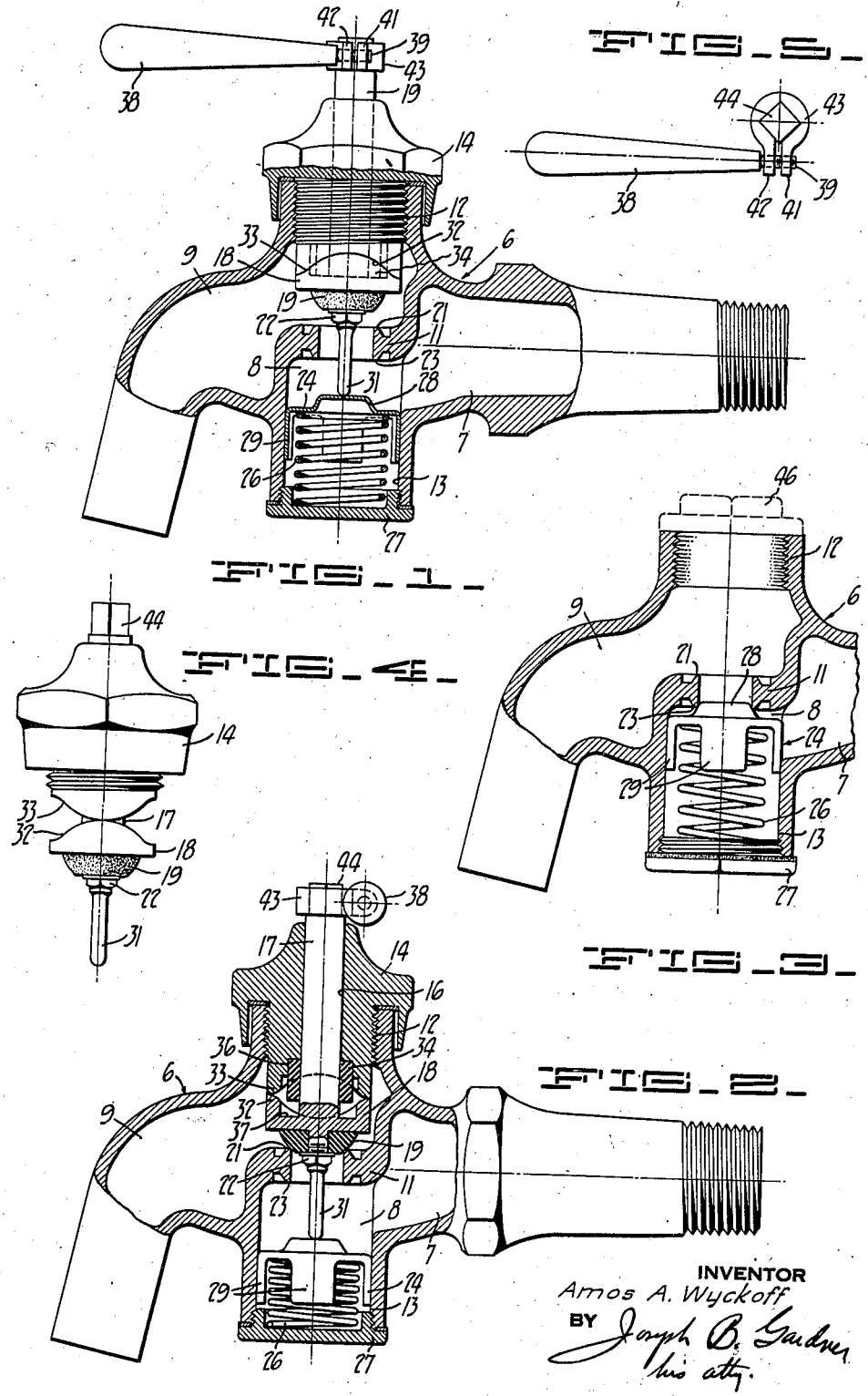
INVENTOR
Amos A. Wyckoff
BY Joseph B. Gardner
his atty.

Patented Feb. 9, 1943

2,310,485

UNITED STATES PATENT OFFICE 2,310,485

FAUCET

Amos A. Wyckoff, Oakland, Calif., assignor to Bernice L. Yauney, Oakland, Calif.

Application September 3, 1940, Serial No. 355,153

1 Claim. (Cl. 251—132)

The invention relates to faucets of the type commonly used for the control of water or other fluid flow and having a manually operated valve for opening and closing and regulating the quantity of such flow.

In faucets of the character described, it is frequently necessary to renew the valve part of the faucet and to do this the faucet is usually dismembered, thus requiring a shutting off of the fluid flow in the line ahead of the faucet. Thus it is usual and customary to incorporate a manual shut-off valve ahead of the faucet in the line. In accordance with the present invention and as a principal object thereof I embody an auxiliary shut-off valve in the faucet body itself which automatically seats and closes off the fluid flow upon dismembering of the faucet to renew the manually operated valve thereof.

Another object of the invention is to provide a faucet of the character described which will be constructed of a minimum number of sturdily formed parts insuring a long and positive useful life of the faucet and being of a design enabling cheap and ready manufacture.

A further object of the invention is to provide a faucet of the character described in which the manually operated valve structure may be removed and the fluid line permanently sealed off.

A still further object of the invention is to provide a faucet of the character described having an improved manual operating mechanism for displacing the valve of the faucet.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a side elevation of a faucet constructed in accordance with the present invention and shown with a portion of the body of the faucet in section, the parts being shown in an open position of the manually operated valve.

Figure 2 is a view similar to Figure 1 but with the valve in closed position.

Figure 3 is a view similar to Figures 1 and 2 but with the manually operated valve removed and the automatic shut-off valve in closed position.

Figure 4 is a side elevation of a part of the operating means of the faucet.

Figure 5 is a plan view of the handle part of the faucet.

The faucet of the present invention consists briefly in a body having a fluid passage therethrough and a valve seat in the passage in combination with a manually operated valve which is movable to and from the seat and an auxiliary shut-off valve which is normally held away from the seat but spring-pressed to move into seated position upon removal of the manually operated valve.

With reference more particularly to the accompanying drawing, the faucet therein depicted comprises a body 6 having a fluid passage 7 therethrough which is divided into inlet and outlet compartments 8 and 9 by an annular shoulder 11 faced on opposite sides thereof to provide valve seats 21 and 23 in the outlet and inlet chambers respectively. The body is formed with open wall portions 12 and 13 at opposite sides of and in substantial axial alignment with the annular shoulder seat 11. Carried in the upper open portion 12 is a threaded closure 14 which in the present instance is formed with an interior central bore 16 adapted for receipt of an elongated valve stem 17. The latter is provided with an enlarged portion 18 which serves as a shoulder or abutment for a disc valve 19 mounted on the stem and adapted for movement to and from the upper face or valve seat 21 of the shoulder 11, the valve 19 being held on the stem against longitudinal displacement against the enlargement by any suitable means, such as the nut 22 here threaded on the stem. The valve 19 is preferably formed of a compressible material such as rubber or other molded composition.

Mounted below the lower face or seat 23 of the shoulder 11 and held for longitudinal reciprocation within the cylindrical open wall portion 13 is an auxiliary shut-off valve 24 which is normally urged longitudinally to engage the seat face 23 by a spring 26 mounted in the open wall portion 13 below the valve and compressed against a threaded end closure 27 in the open end of the wall portion 13. As here shown, the valve 24 is preferably formed of a metal stamping having a tapered top portion 28 adapted to engage and wedge against the seat face 23 and is formed with a plurality of depending legs 29 having an arcuate periphery reciprocally engaged by the cylindrical side wall 13.

In the assembled position of the parts as illustrated in Figures 1 and 2, the inner end 31 of the valve stem projects centrally through the annular shoulder 11 and engages the top of the valve 24 so as to hold the latter in open position away from the seat face 23. Means is provided for causing a longitudinal displacement of the valve stem and the valve 19 carried thereon incident to a rotational displacement of the stem 17 so as to seat and unseat the valve 19 for manual operation of the faucet, but in accordance with the present design the longitudinal displacement of the stem is insufficient to permit a seating of valve 24 whereby the latter is constantly held in open position, regardless of the seated or unseated position of valve 19. In the present construction I prefer to obtain this longitudinal displacement of the stem upon rotation by use of appropriate cam shaped surfaces rather than threads as is customary in the art. In accordance with the present construction the upper face 32 of the enlarged stem portion 18 cooperates with the inner face 33 of the closure 14 to provide proper longitudinal displacement of the stem upon relative rotation thereof. As here shown the inner end of the closure and the outer end of the enlargement are recessed centrally so as to leave peripheral contacting faces which, as will be best seen in Figures 1, 2 and 4, are undulated circumferentially so as to displace the stem longitudinally towards the valve seat upon rotation of the stem to engage the high portions of the undulations, as illustrated in Figures 2 and 4, and to permit longitudinal movement of the stem away from the valve seat under the resilient action of spring 26 upon rotation of the stem to nest the high and low portions of the undulations, as illustrated in Figure 1. Preferably, provision is made for sealing off the flow of fluid along the valve stem through the bore 16 of the closure 14 when the valve 19 is in open position, and as here shown, I mount a sealing gasket 34 in a receiving recess 36 therefor formed in the inner end of the closure 14 surrounding the stem 17 and which extends for a sufficient longitudinal distance along the stem to engage the base 37 of the recess provided in the outer end of the enlargement 18 when the valve stem is moved to its outward position, as illustrated in Figure 1. Means for rotating the valve stem is here in the form of a handle 38 which has one end 39 thereof threaded through the free ends 41 and 42 of a circular clamp 43 fitted about the upper end 44 of the valve stem. As will be noted by reason of the handle attachment, the longitudinal axis of the handle 38 is offset somewhat from the axis of the stem 17 and in this manner provides better leverage and operation than in instances where the handle axis intersects the stem axis.

It will now be clear that in the usual operation of the faucet, the auxiliary shut-off valve 24 will be retained in open position and the valve 19 moved to open and closed position to control the fluid flow through the faucet as the handle 38 is rotated between operative positions. Upon wearing out of the valve 19 and fluid leakage incurred thereby, the faucet may be quickly and readily dismembered for renewing of the valve 19 by merely unthreading the closure 14 to remove the valve and operating structure therewith and thereafter unthreading the nut 22 and replacing the valve 19. As an important feature in the design, the length of threaded attachment of the closure 14 is somewhat greater than the length of movement of the shut-off valve 24 to closed position, whereby the valve 24 will become seated prior to complete unthreading of the closure 14, thereby insuring a sealing off of the fluid line prior to removal of the closure. Conversely, upon reinsertion of the operating mechanism, the closure will be securely threaded into the body before the shut-off valve 24 is opened. In instances where it may be desirable to discontinue the use of a faucet at the end of a fluid line, the manual operating means may be permanently removed from the faucet and the line permanently closed by the auxiliary shut-off valve. In such case it is recommended that an ordinary closure plug 46 be threaded into the opening 12 of the faucet, as illustrated in Figure 3, to take the place of the closure 14 and operating faucet structure.

I claim:

A faucet comprising, a body having a fluid passage therethrough and a valve seat in said passage and an opening in the side wall of said body substantially axially aligned with said seat, a closure threaded into said opening and having a central bore therethrough, a valve stem rotatably mounted in said bore and having an enlarged interior portion engaged with the inner end of said closure, said closure end and said enlarged stem portion being recessed centrally thereof to define a compartment therebetween and to further define annular contact faces, said contact faces being undulated to nest one within the other to effect longitudinal displacement of said stem upon rotation thereof, a valve carried by said stem at the inner side of said enlarged portion and movable with said stem into and out of engagement with said seat, spring means urging said valve from said seat and maintaining engagement between said contact faces, and a cylindrical gasket carried by said closure in said compartment and surrounding said stem and engageable with said enlarged stem portion in said recess thereof upon movement of said valve from said seat to seal said stem in said bore.

AMOS A. WYCKOFF.